(12) United States Patent
Yamanaka

(10) Patent No.: US 11,608,113 B2
(45) Date of Patent: Mar. 21, 2023

(54) VEHICLE DRIVING ASSIST SYSTEM

(71) Applicant: HONDA MOTOR CO., LTD., Tokyo (JP)

(72) Inventor: Hiroshi Yamanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 17/109,869

(22) Filed: Dec. 2, 2020

(65) Prior Publication Data

US 2021/0179173 A1    Jun. 17, 2021

(30) Foreign Application Priority Data

Dec. 13, 2019   (JP) .............................. JP2019-225938

(51) Int. Cl.
    *B62D 15/02*      (2006.01)
    *G06T 11/20*      (2006.01)
    *H04N 5/262*      (2006.01)

(52) U.S. Cl.
    CPC .......... *B62D 15/029* (2013.01); *G06T 11/203* (2013.01); *H04N 5/2628* (2013.01)

(58) Field of Classification Search
    CPC .................................................... B62D 15/029
    See application file for complete search history.

(56) References Cited

U.S. PATENT DOCUMENTS 9,896,130 B2 * 2/2018 Ghneim ................. B62D 13/06
10,112,646 B2 * 10/2018 Lavoie ................. B62D 15/029

FOREIGN PATENT DOCUMENTS

JP      2013228802 A    11/2013

\* cited by examiner

*Primary Examiner* — Travis R Hunnings
(74) *Attorney, Agent, or Firm* — Armstrong Teasdale LLP

(57) ABSTRACT

To assist a vehicle operator in performing turning maneuvers in an appropriate manner under all conditions, a vehicle driving assist system includes: an external environment acquiring unit configured to acquire information on external environment surrounding a vehicle; a display unit having a screen displaying the information on the external environment; a steering state acquiring unit configured to acquire a steering status of the vehicle; and an image processing unit configured to determine a predicted trajectory of the vehicle according to the steering status of the vehicle, and superimpose the predicted trajectory on the information on the external environment displayed on the screen, wherein in case the predicted trajectory happens to be a full circle, the image processing unit removes a far end part of the trajectory to be displayed so as not to be connected to a start point of the trajectory on the screen.

9 Claims, 6 Drawing Sheets

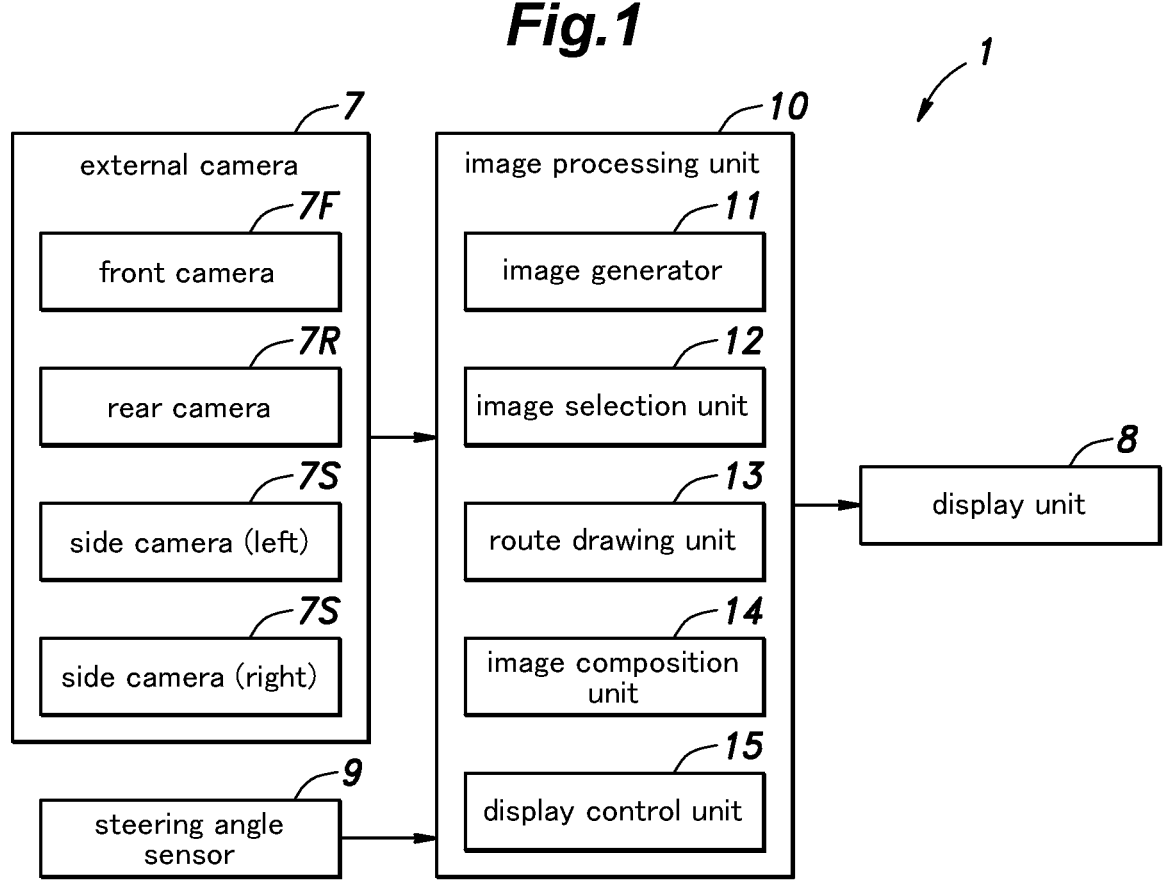

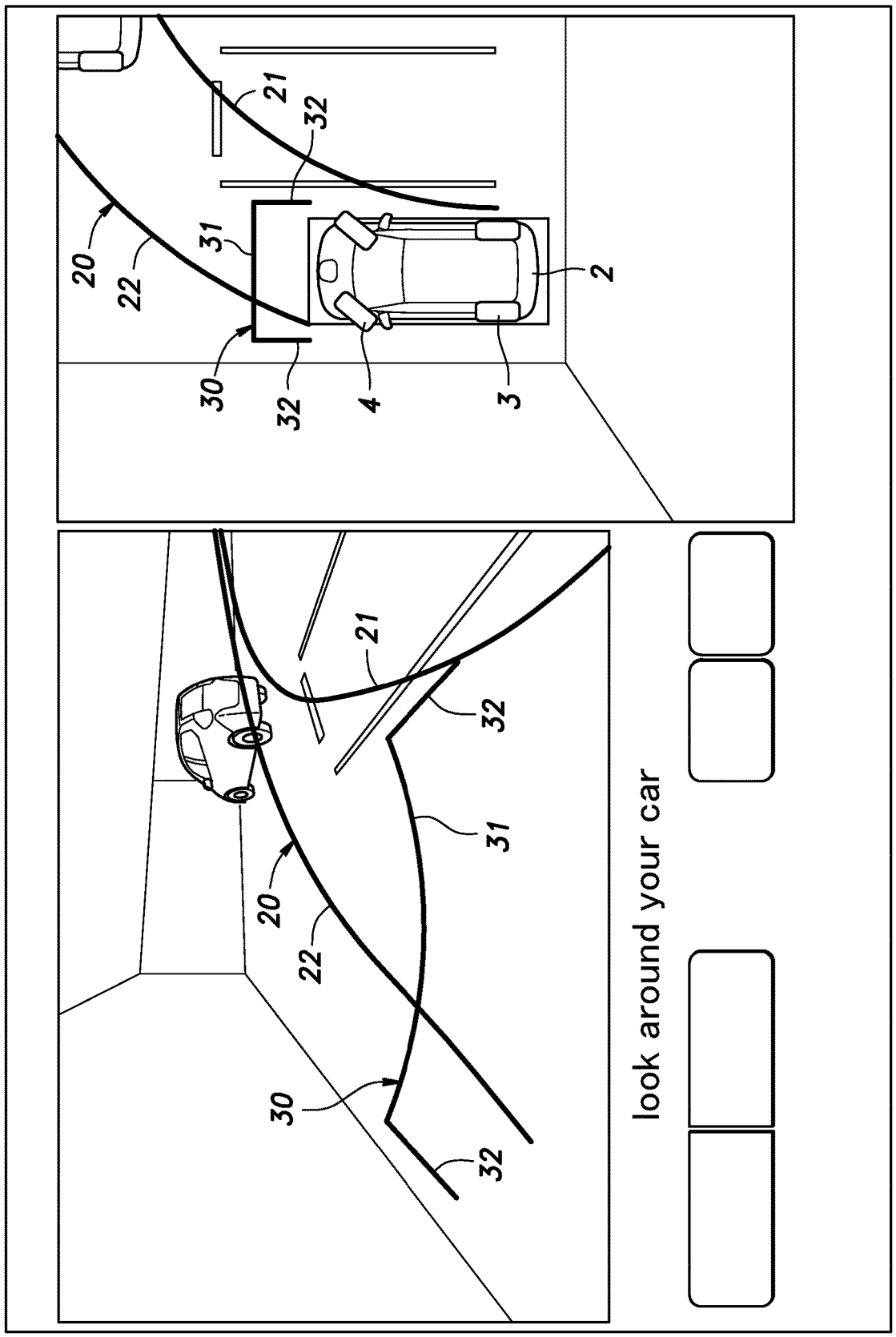

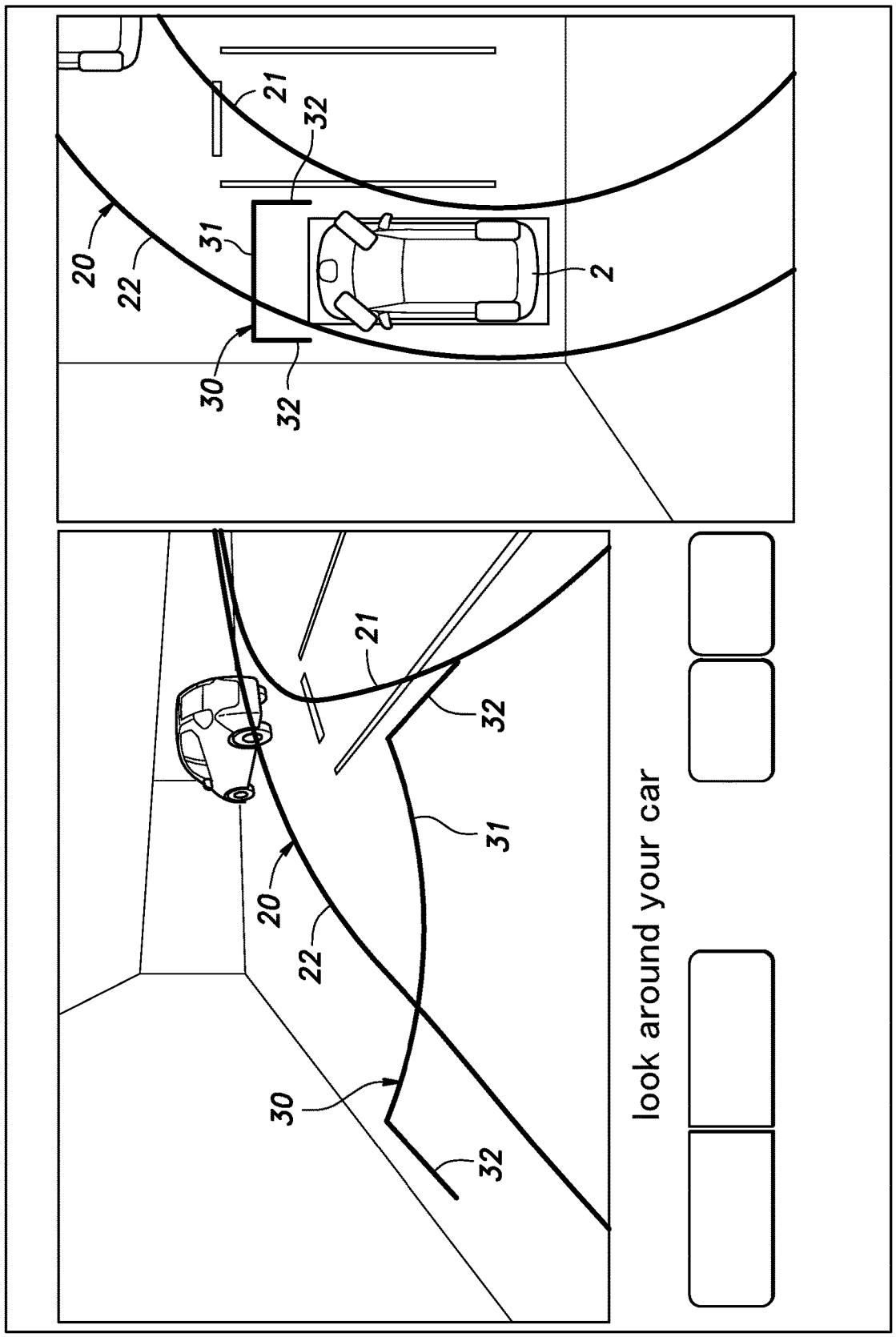

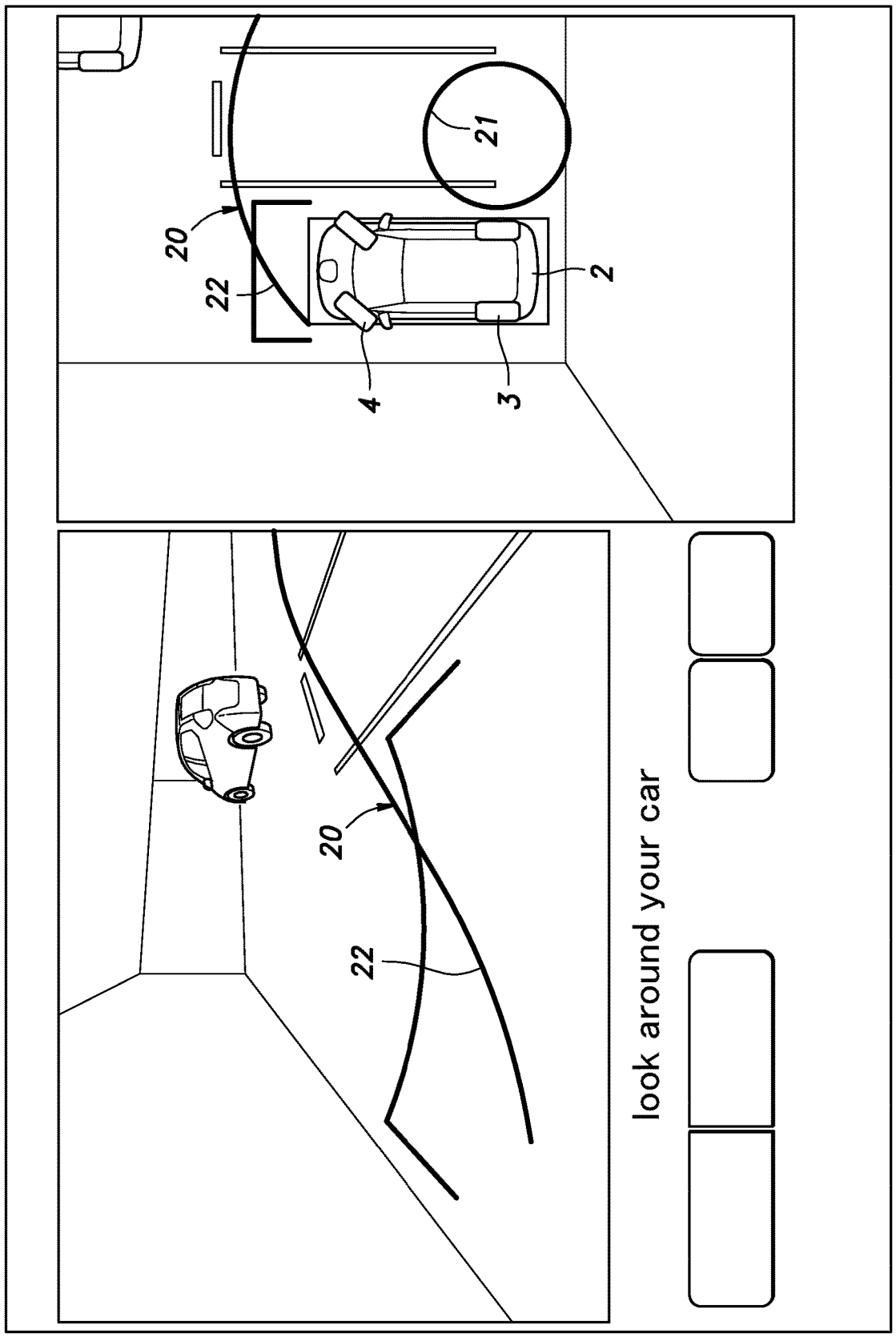

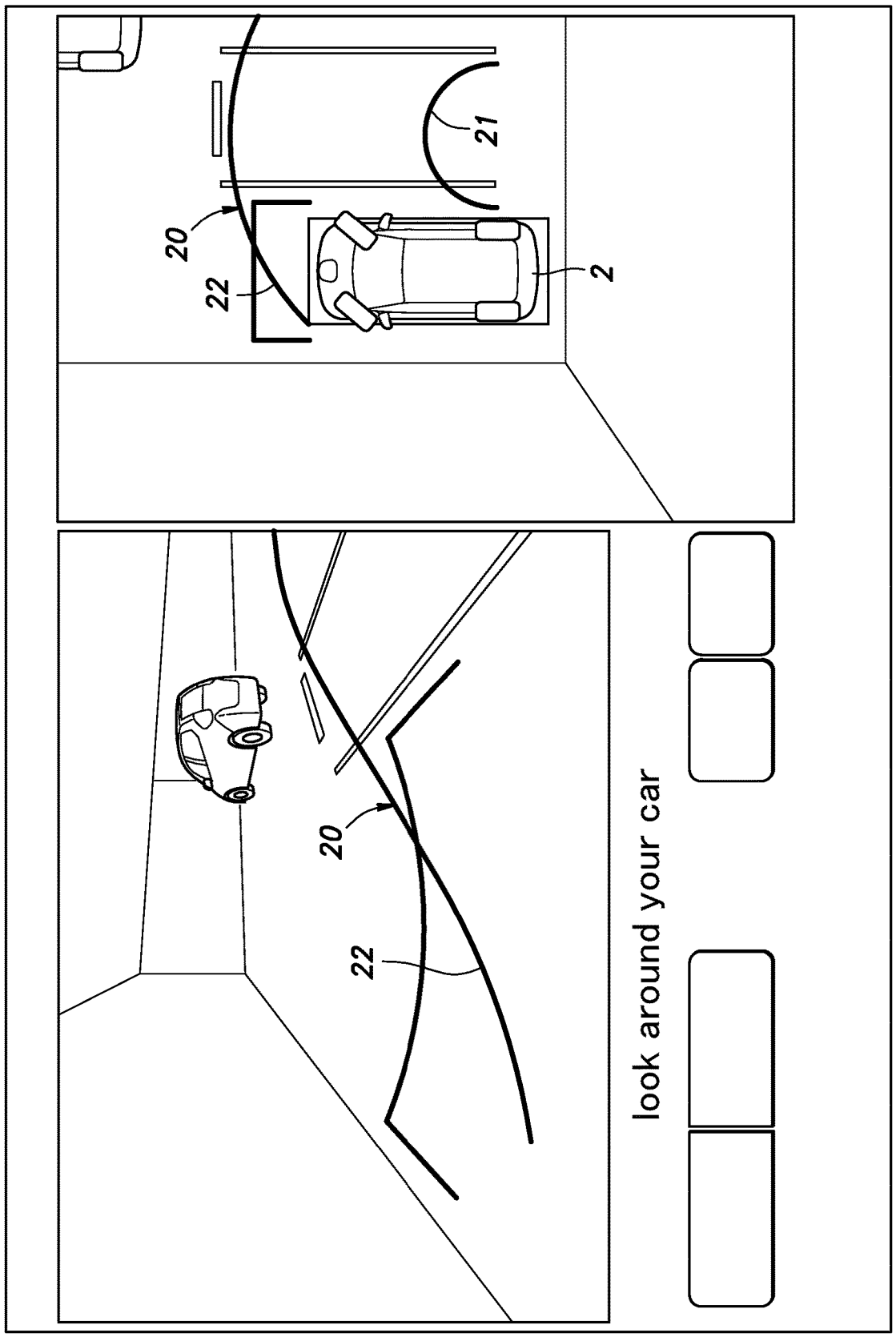

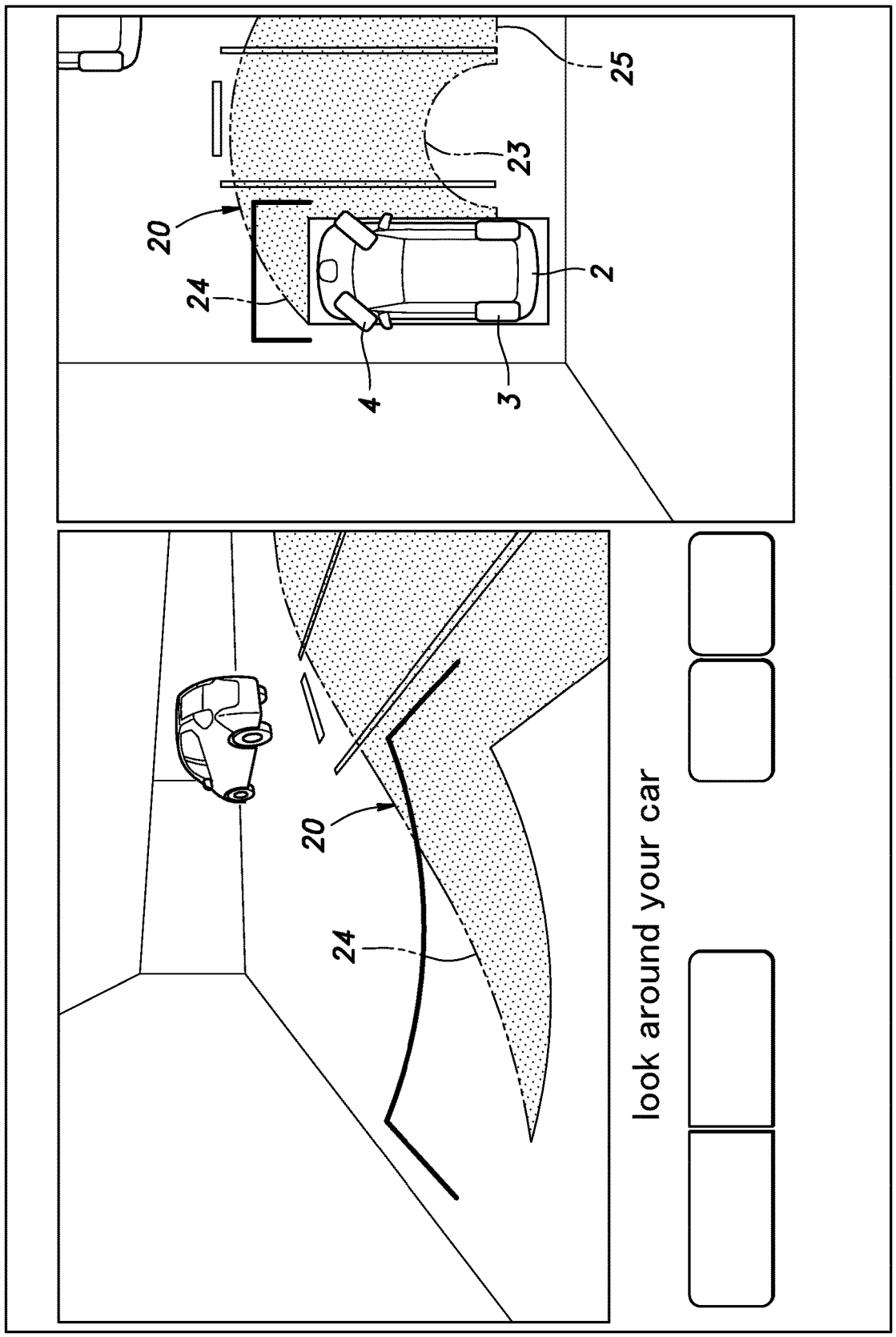

VEHICLE DRIVING ASSIST SYSTEM

TECHNICAL FIELD

The present invention relates to a vehicle driving assist system provided with a display unit configured to display a future trajectory of a vehicle.

BACKGROUND OF THE INVENTION

It is known to display a predicted trajectory of a vehicle for the purpose of assisting a vehicle operator in the turning maneuver of the vehicle. According to the system proposed in JP2013-228802A, the image of the surrounding environment within a range of about 30 m is captured by an image capturing unit and displayed on a display unit, and the future trajectory of the own vehicle predicted from the steering information is superimposed on the image of the surrounding environment on the display unit. This system allows the vehicle operator to determine if the vehicle can safely make a U-turn with the current steering operation, and assists the vehicle operator in making the U-turn successfully.

It is also known to display the surrounding environment as a bird's-eye view or a view from directly above the vehicle which may be obtained by suitably converting a 360-degree view of the environment surrounding the vehicle. By using such a bird's-eye view, the vehicle operator is enabled to grasp the surrounding environment in an easily understandable manner so that the vehicle can be moved backward, and maneuvered in a restricted area with ease.

In such a vehicle driving assist system, the predicted path or trajectory of the vehicle may be represented by a full circle if the turn is tight enough. However, when the display shows a full circle as a predicted trajectory of the vehicle, the vehicle operator may fail to intuitively understand the display as indicating the predicted trajectory of the vehicle. A full circle displayed on the screen tends to be confused with other symbols.

BRIEF SUMMARY OF THE INVENTION

In view of such a problem of the prior art, a primary object of the present invention is to provide a vehicle driving assist system that can assist the vehicle operator in performing turning maneuvers in an appropriate manner under all conditions.

To achieve such an object, the present invention provides a vehicle driving assist system (1), comprising: an external environment acquiring unit (7) configured to acquire information on external environment surrounding a vehicle (2); a display unit (8) having a screen displaying the information on the external environment;
a steering state acquiring unit (9) configured to acquire a steering status of the vehicle; and an image processing unit (10) configured to determine a predicted trajectory (20) of the vehicle according to the steering status of the vehicle, and superimpose the predicted trajectory on the information on the external environment displayed on the screen, wherein in case the predicted trajectory happens to be a full circle, the image processing unit removes a far end part of the trajectory to be displayed so as not to be connected to a start point of the trajectory on the screen.

Thereby, the trajectory displayed on the screen is prevented from turning into a full circle so that the vehicle operator can take advantage of the driving assist provided by the driving assist system without being distracted by a confusing display.

In this vehicle driving assist system, preferably, when the vehicle is turning, the predicted trajectory of the vehicle displayed on the screen includes an inner edge line (21) indicating an inner edge of a region to be swept by the vehicle, and an outer edge line indicating an outer edge of the region to be swept by the vehicle.

Thereby, the vehicle operator is enabled to make sure that no part of the vehicle will interfere with an external object or go beyond a prescribed limit in an intuitive manner.

In this vehicle driving assist system, preferably, in case the predicted trajectory happens to be a full circle, the image processing unit is configured to draw the trajectory to be displayed on the screen as a circular sector with a central angle equal to or greater than 180 degrees but smaller than 360 degrees.

Thereby, when the vehicle operator intends to make a U-turn, the necessary information on the predicted trajectory of the vehicle for making the U-turn can be properly conveyed to the vehicle operator.

In this vehicle driving assist system, preferably, when the predicted trajectory of the vehicle goes beyond an edge of the screen and comes back into the screen, the image processing unit removes a part of the trajectory to be displayed that comes back into the screen.

Thereby, the part of the trajectory that comes back into the screen is prevented from confusing or otherwise distracting the vehicle operator.

In this vehicle driving assist system, preferably, when the inner edge line is a full circle, and the outer edge line is a circular sector with a central angle smaller than 360 degrees, the inner edge line and the outer edge line are displayed as circular sectors having mutually different central angles on the screen.

Thereby, the vehicle operator is enabled to know that the inner edge line and the outer edge line displayed on the screen represent the predicted trajectory of the relevant parts of the vehicle in an intuitive manner so that the convenience of the vehicle driving assist system can be enhanced.

In this vehicle driving assist system, preferably, the central angle of the inner edge line that is displayed is greater than the central angle of the outer edge line.

The inner edge line is typically more critical than the outer edge line when maneuvering the vehicle in a limited space. Therefore, by selecting the central angle of the inner edge line to be greater than the central angle of the outer edge line, the vehicle operator is allowed to focus on the external object or the off-limit part on the road that requires utmost attention.

In this vehicle driving assist system, preferably, the external environment acquiring unit comprises an image capturing device configured to capture an image of the external environment surrounding the vehicle, and the image processing unit is configured to convert the image acquired by the image capturing device into a bird's eye view to be displayed on the screen.

Thereby, the vehicle operator is enabled to have a 360 degree view around the vehicle as seen from directly above the vehicle so that maneuvering of the vehicle in a limited area, and driving the vehicle rearward are facilitated.

In this vehicle driving assist system, preferably, the image processing unit (10) is configured to represent the predicted trajectory of the vehicle as a band area delimited by the inner edge line (21), the outer edge line (22) and a front edge line extending from a remote end of the inner edge line orthogonally thereto.

Thereby, the predicted travel path of the vehicle can be displayed in a readily understandable manner.

In this vehicle driving assist system, preferably, the band area is represented by a semi-transparent band area superimposed on the display on the screen.

Thereby, the predicted travel path of the vehicle can be displayed in an even more readily understandable manner.

Thus, the present invention provides a vehicle driving assist system that can assist the vehicle operator in performing turning maneuvers in an appropriate manner under all conditions.

BRIEF DESCRIPTION OF THE DRAWINGS

FIG. 1 is a functional block diagram of a vehicle equipped with a driving assist system according to a first embodiment of the present invention;

FIG. 2 is an illustrative view of a touch panel screen when the steering angle of the front wheels is relatively small according to the first embodiment of the present invention;

FIG. 3 is an illustrative view of a touch panel screen when the steering angle of the front wheels is relatively small according to the prior art;

FIG. 4 is an illustrative view of a touch panel screen when the steering angle of the front wheels is relatively large according to the first embodiment of the present invention;

FIG. 5 is an illustrative view of a touch panel screen when the steering angle of the front wheels is relatively small according to the prior art; and FIG. 6 is a view similar to FIG. 4 according to a second embodiment of the present invention.

DETAILED DESCRIPTION OF THE PREFERRED EMBODIMENT(S)

Now the present invention is described in the following in more detail in terms of concrete embodiments with reference to the appended drawings.

First Embodiment

The driving assist system 1 is mounted on a vehicle 2 (see FIG. 2) such as an automobile. The vehicle 2 is a four-wheeled vehicle, and includes a travel motor (propulsion device) for driving the rear wheels 3 (driving wheels), and a steering device for steering the front wheels 4 (steered wheels).

As shown in FIGS. 1, the driving assist system 1 includes an external camera 7 that capture the image of the surrounding environment of the vehicle 2, a display unit 8 that has a screen for displaying an image of the surrounding environment of the vehicle 2 captured by the external camera 7, and a steering angle sensor 9 for detecting a steering angle of the front wheels 4, and an image processing unit 10 for controlling the screen display of the display unit 8.

The external camera 7 is an image capturing device that images the surrounding environment of the vehicle 2, and is, for example, a digital camera that uses a solid-state image sensor such as a CCD and CMOS. The external camera 7 includes a front camera 7F that images the front view from the vehicle 2, a rear camera 7R that images the rear view from the vehicle, and a pair of side cameras 7S that image the respective side views from the vehicle. Alternatively, the external camera 7 may consist of a single omnidirectional camera capable of capturing a 360 degree view around the vehicle 2. The external camera 7 outputs the captured environment image information of the vehicle 2 to the image processing unit 10.

The steering angle sensor 9 may directly detect the steering angle of the front wheels 4, or may detect the rack displacement of a rack and pinion device or the angular position of the steering wheel. The steering angle sensor 9 outputs the detected steering angle of the front wheels 4 to the image processing unit 10. The steering angle sensor 9 is thus a steering state acquiring unit that acquires the steering status of the vehicle 2. The image processing unit 10 acquires the steering angle of the front wheels 4 by receiving the output from the steering angle sensor 9 or by performing a predetermined calculation based on the output received from the steering angle sensor 9.

The display unit 8 may consist of the display unit of a navigation device, and is provided at a position such as a dashboard or an instrument panel that is readily visible to the driver of the vehicle 2. The display unit 8 may have a screen consisting of liquid crystal or organic EL or the like, and may be a touch panel that can accept an input operation from the vehicle operator, or a display-only device that cannot accept an input operation. The screen display of the display unit 8 is controlled by the image processing unit 10.

The display unit 8 is not limited to the one fixed to the vehicle 2, but may also be removable from the vehicle 2 or may be a display unit of a portable terminal carried by the user. When the display unit 8 is a terminal separate from the vehicle 2, the display unit 8 may be controlled by the image processing unit 10, for example, via wirelessly communication based on Bluetooth (registered trademark). The wireless communication is not limited to this, but may also be based on Wi-Fi (registered trademark) or a mobile phone communication network. Alternatively, a part or all of the functional parts of the image processing unit 10 may be performed by the terminal operating under a suitable software application. By configuring the wireless communication in this way, general-purpose communication devices such as tablets, smartphones, and mobile phones can be used at least as a part of the display unit 8 and the image processing unit 10.

The image processing unit 10 is an electronic control unit (ECU) including a CPU, a non-volatile memory (ROM), a volatile memory (RAM), and the like. The image processing unit 10 executes various screen display controls for the display unit 8 by executing arithmetic processing with the CPU according to a prescribed computer program. The image processing unit 10 may be configured as a piece of hardware, or may be configured as a unit composed of a plurality of pieces of hardware.

The image processing unit 10 includes an image generator 11. The image generator 11 converts an image (video image) captured by the external camera 7 by executing arithmetic processing according to a prescribed computer program, and generates a bird's-eye view image of the vehicle 2 and the surrounding environment thereof.

Here, the bird's-eye view image is an image corresponding to a plan view of the own vehicle and the surrounding area of the own vehicle as viewed directly from above. The bird's-eye view image may also mean an image corresponding to a perspective view as viewed from above at a certain distance behind the own vehicle. In the latter case, the bird's-eye view image consists of a view as viewed in a downward and forward direction from above at a certain distance behind (opposite to the traveling direction) the own vehicle when the vehicle is traveling forward, and a view as viewed in a downward and rearward direction from above at a certain distance in front of (opposite to the traveling direction) the own vehicle when the vehicle is traveling rearward. If the vehicle is traveling forward or rearward can be determined from the traveling speed of the vehicle, and/or on the shift position (shift position, shift range) of the power transmission of the vehicle.

The image processing unit 10 may generate a bird's-eye view image by combining the images of the front camera 7F, the rear camera 7R, and the side cameras 7S, or alternatively, the image of the front camera 7F or the rear camera 7R depending on which direction the vehicle is traveling, in combination with the images of the side cameras 7S.

The front view in the traveling direction may also be displayed on the screen. The traveling direction is determined from the shift position (shift range). When the shift position is in reverse, the front view image is obtained from the rear camera 7R. When the shift position is otherwise such as park, neutral, drive and so on, the front view image is obtained from the front camera 7F.

The image processing unit 10 further includes an image selection unit 12, a route drawing unit 13, and an image composition unit 14. The image selection unit 12 selects one or more images to be displayed on the display unit 8 from the generated bird's-eye view image, and the front view image in the traveling direction captured by the external camera 7 depending on the state of the vehicle 2. The route drawing unit 13 draws the predicted traveling path 20 (see FIG. 2) of the vehicle 2 based on the steering angle of the front wheels 4 detected by the steering angle sensor 9. The image composition unit 14 superimposes the predicted traveling path 20 on the bird's-eye view image, and the front view image in the traveling direction. Further, the image processing unit 10 has a display control unit 15 that displays one or more images selected by the image selection unit 12 and processed by the image composition unit 14 on the screen of the display unit 8.

For example, when a driving assist switch is pressed by the vehicle operator, the image processing unit 10 causes the display unit 8 to display a driving assist screen as shown in FIG. 2. FIG. 2 shows the screen of the display unit 8 consisting of a touch panel screen when the steering angle of the front wheels 4 is relatively small. On this driving assist screen, a bird's-eye view image is displayed on the right side of the screen, and a front view image in the traveling direction is displayed on the left side of the screen. The bird's-eye view image consists of a plan view of the vehicle 2 and the surrounding with the front end of the vehicle facing upward on the screen. The front view image in the traveling direction is an image captured by the front camera 7F which has a wide angle lens in the illustrated example.

The image processing unit 10 superimposes the traveling path 20 on each of the bird's-eye view image and the front view image on the driving assist screen. Further, the image processing unit 10 displays reference lines 30 on each of the bird's-eye view image and the front view image in the traveling direction so that the correspondence between the bird's-eye view image and the front view image can be understood by the vehicle operator. The reference lines 30 includes a fore and aft reference line 31 extending laterally in front of the vehicle 2 at a prescribed distance from the front end of the vehicle 2, and a pair of lateral reference lines 32 extending rearward from either lateral end of the fore and aft reference line 31 each by a prescribed distance. The length of the fore and aft reference line 31 is slightly larger than the width of the vehicle 2, and the lateral reference lines 32 extend rearward from the respective ends of the fore and aft reference line 31. The reference lines 30 thus have a rectangular U shape in the bird's-eye view image, and have a curved shape in the front view image so as to correspond to the image distortion caused in the front view image by the wide angle lens.

Alternatively, the image processing unit 10 may display a bird's-eye view image as viewed downward from directly above the vehicle on the right side of the screen and a bird's-eye view image as viewed downward from a point above the vehicle and somewhat behind the vehicle on the left side of the screen, as a driving assist screen. In this case also, the image processing unit 10 superimposes the predicted traveling path 20 and the reference lines 30 on both the bird's-eye view images on the driving assist screen.

The traveling path 20 based on the steering angle of the front wheels 4 extends from the vehicle 2 in the traveling direction and curves into a circle which extends eventually back to the vehicle 2 unless the steering angle is 0. When such a traveling path 20 is displayed in front of and behind the vehicle 2 as shown in FIGS. 3, the vehicle operator may not determine if the vehicle 2 is traveling forward or rearward. Therefore, according to the present invention, the image processing unit 10 displays only the portion of the traveling path 20 extending from the starting point (point on the vehicle 2 or in the vicinity of the vehicle 2) to the edge of the screen (the frame for displaying the image), and removes the portion of the traveling path which comes back into the screen and extends back to the vehicle 2.

As a result, as shown in FIGS. 2, not only the far end part of the traveling path 20 extending beyond the edge of the screen, but also the far end part of the traveling path 20 extending back into the screen are not displayed on the screen. Thus, the display of the traveling path 20 is simplified so that the vehicle operator can readily discern how the vehicle 2 is about to travel.

In the illustrated embodiment, the traveling path 20 consists of a pair of lines indicating the path of one side of the vehicle 2 (the inner edge line 21) and the path of the other side of the vehicle 2 (the outer edge line 22). Thus, the vehicle operator is enabled to know the area on the road surface over which the vehicle 2 sweeps (or occupies).

The inner edge line 21 of the traveling path 20 has a center corresponding to the turning center of the vehicle 2 located on the extension line of the rear wheel axle, and is an arc-shaped line passing through the rear wheel 3 or the innermost turning point of the vehicle 2. More specifically, the inner edge line 21 of the traveling path 20 is set so as to pass through a point slightly inside the rear wheel 3 on the inside of the turn in order to prevent hitting an object or a pedestrian with the inner side of the vehicle when making a sharp turn due to the difference in the trajectories of the wheels on the inner side.

The outer edge line 22 of the traveling path 20 has a center that coincides with the turning center, and is given as an arcuate trajectory drawn by the outer front end of the vehicle. More specifically, the outer edge line 22 of the traveling path 20 is set so as to pass through a point slightly outer side of the outer front end of the vehicle in order to prevent hitting an object or a pedestrian with the outer side of the vehicle when making a sharp turn.

The inner edge line 21 and the outer edge line 22 of the traveling path 20 are drawn in an arcuate shape in the bird's-eye view screen as seen from directly above, and are drawn in a distorted arcuate shape (which is computed by a prescribed coordinate conversion algorithm) in the front view as viewed forward from the vehicle 2.

When the vehicle 2 is driven autonomously, the display on the screen may include a stop line to indicate the position of the front end (when the vehicle is traveling forward) or the rear end (when the vehicle is traveling rearward) of the vehicle 2 when the vehicle has come to a stop at a designated spot, typically a parking space. In such a case, the inner edge line 21 and the outer edge line 22 need only extend to the stop line so that the part of the traveling path 20 extending beyond the stop line may be omitted or removed from the display.

As discussed above, the image processing unit 10 draws the traveling path 20 of the vehicle 2 on the display according to the steering angle of the front wheels 4, and superimposes the drawn traveling path 20 on the bird's-eye view image (or the front view) of the surroundings of the vehicle 2 on the driving assist screen of the display unit 8. As a result, the vehicle operator can obtain a 360 degree view around the vehicle 2 from the screen of the display unit 8 at a single glance, and can readily determine if there is any obstacle on the traveling path 20. Thus, maneuvering the vehicle 2 in a limited space or driving the vehicle 2 rearward are facilitated.

The radius of the traveling path 20 of the vehicle 2 becomes smaller as the wheelbase of the vehicle 2 is decreased, and the steering angle of the front wheels 4 is increased. Further, the radius of the inner edge line 21 of the traveling path 20 is smaller than the radius of the outer edge line 22 of the traveling path 20 by at least the vehicle width. Therefore, the shorter the wheelbase of the vehicle 2 is, and the larger the maximum steering angle of the front wheels 4 is, the more likely it becomes for the inner edge line 21 of the traveling path 20 to be a circle that fits within the screen of the bird's-eye view image (without exceeding the edge of the screen of the bird's-eye view image) as shown in FIG. 4.

In such a case, or when the inner edge line 21 of the traveling path 20 is displayed as a full circle on the inner side of the vehicle 2 on the screen of the display unit 8, the occupant may confuse this circle with a symbol, a button or the like. It is likely for the vehicle operator to recognize that this circle indicates the inner edge line 21 of the traveling path 20, instead of correctly identifying the circle as indicating the inner edge line 21.

Based on such a consideration, the image processing unit 10 is configured such that the far end part of the inner edge line 21 of the traveling path 20 is not connected to the start point (the inner rear wheel 3) of the inner edge line 21 as shown in FIG. 5. More specifically, the inner edge line 21 of the traveling path 20 is drawn as a circular sector with a central angle of 180 degrees, and removes the remaining part of the full circle from the display on the driving assist screen of the display unit 8. This central angle may be any angle smaller than 360 degrees. The central angle is preferably equal to or greater than 180 degrees, and more preferably between 180 degrees and 270 degrees.

Thus, when the inner edge line 21 of the traveling path 20 to be displayed and superimposed on the bird's-eye view image becomes a full circle (see FIG. 4), the image processing unit 10 removes the far end part of the inner edge line 21 of the traveling path 20 so as to be a circular sector having a central angle of less than 360 degrees so that the far end part of the inner edge line 21 is not connected to the starting point of the inner edge line 21 (see FIG. 5). This makes it easier for the vehicle operator to recognize that the circular sector indicates the predicted traveling path 20. Therefore, the vehicle operator can readily determine the predicted traveling path 20 of the vehicle 2, and the condition of the area adjacent to the predicted traveling path 20 from the screen of the display unit 8.

In particular, when the vehicle operator is trying to make a U-turn, owing to the fact that the image processing unit 10 has drawn the predicted traveling path 20 of the vehicle 2 as a circular sector having a central angle which may be somewhat greater than 180 degrees, but substantially less than 360 degrees, the predicted position of the vehicle 2 during and upon completion of the intended U-turn in an intuitive manner can be readily recognized by the vehicle operator.

When the far end part of the predicted outer edge line 22 goes beyond the edge of the screen of the display unit 8 (as shown in FIG. 3), the far end part is naturally not displayed. According to the illustrated embodiment, the far end part of the predicted outer edge line 22 which returns back into the screen of the display unit 8 (which is otherwise connected to the start point) is removed, and not displayed (as shown in FIG. 2). Thereby, the vehicle operator is enabled to recognize that the outer edge line 22 indicates the traveling path 20 of the vehicle 2 without any confusion. Furthermore, the predicted outer edge line 22 displayed in this fashion allows the vehicle operator to determine in which direction the vehicle is traveling without any confusion.

The inner edge line 21 and the outer edge line 22 of the traveling path 20 have a common center which coincides with the turning center of the vehicle 2 located on the extension line of the rear wheel axle of the vehicle 2. In other words, the point where the outer edge line 22 goes beyond the edge of the screen of the bird's-eye view image is located ahead of the extension line of the rear axle, and is a circular sector having a central angle smaller than 180 degrees. The same is true with the inner edge line 21 if the far end part of the inner edge line 21 goes beyond the edge of the screen of the bird's-eye view image. If the inner edge line 21 does not go beyond the edge of the screen of the bird's-eye view image, the inner edge line 21 of the traveling path 20 is drawn as an arcuate sector having a central angle of 180 degrees or more.

In the illustrated embodiment, the predicted traveling path 20 of the vehicle with the inner edge line 21 and the outer edge line 22 is represented as circular sectors having mutually different central angles. Thereby, the vehicle operator is enabled to discern that the inner edge line 21 and the outer edge line 22 indicate the predicted traveling path 20 of the vehicle 2 in a clear manner so that the convenience of the driving assist system 1 can be enhanced.

In such a case, the image processing unit 10 draws the predicted traveling path 20 in such a manner that the central angle of the inner edge line 21 is larger than the central angle of the outer edge line 22. As a result, the inner edge of the traveling path 20 which particularly requires the attention of the vehicle operator is shown as an arc of a larger central angle than the outer edge of the traveling path 20 so that the vehicle operator is enabled to evade any obstacle that may exist with more ease.

Second Embodiment

FIG. 6 shows a touch panel screen of a driver assist system according to a second embodiment of the present invention. This shows an example where the steering angle of the front wheels 4 is relatively large. In this embodiment also, the traveling path 20 of the vehicle 2 is represented by a band having an inner edge line 23 indicating a trajectory of the inner inside of the vehicle 2 in a turn and an outer edge line 24 indicating a trajectory of the outer side of the vehicle 2 in a turn. The traveling path 20 represented by a band is displayed as a semi-transparent area on a bird's-eye view image or a front view image in the traveling direction so that obstacles and other objects on the path can be recognized.

In this case, as shown in FIGS. 6, the inner edge line 23 of the traveling path 20 superimposed on the bird's-eye view image becomes a semicircle and the outer edge line 24 of the traveling path 20 extends to a side edge of the screen. The far end of the semi-transparent area representing the traveling path 20 is delimited by a front edge line 25 which is orthogonal to the inner edge line 23. The front edge line 25 may be considered as the position of the rear axle of the vehicle 2 upon completion of a 180 degree turn. As mentioned earlier, the central angle of the circular sector defined by the inner edge line 23 is not limited to 180 degrees, but may be either smaller or larger than 180 degrees as long as substantially less than 360 degrees. The traveling path 20 is represented in the front view shown on the left hand side of the screen by an area delimited by distorted lines.

By displaying the traveling path 20 as a band area delimited by the inner edge line 23, the outer edge line 24 and the front edge line 25 (in the bird's-eye view image), the predicted traveling path 20 of the vehicle 2 can be displayed in a readily understandable manner. This band may be a solid band area or an opaque band area superimposed on the display on the screen, but preferably by a semi-transparent band area superimposed on the display on the screen for an improved understanding of the surrounding area.

The present invention has been described in terms of specific embodiments, but is not limited by such embodiments, and can be modified in various ways without departing from the scope of the present invention.

For example, the external camera 7 may consist of any other external environment sensors using electromagnetic waves, sound waves and laser light such as sonars, radars and lidars.

A sonar is an ultrasonic sensor which emits ultrasonic wave and detects the position (distance and direction) of an object by analyzing the ultrasonic wave reflected by the object. A millimeter wave radar emits millimeter electromagnetic wave and detects the position (distance and direction) of an object by analyzing the millimeter electromagnetic wave reflected by the object. A lidar emits a laser light beam and detects the position (distance and direction) of an object by analyzing the laser light reflected by the object. Such sensors may be positioned on the front, rear and side parts of the vehicle 2.

The objects detected by such a sensor may be displayed on the display unit 8 in such a manner that the positions of the detected objects may be comprehended by the vehicle operator. Typically, a coordinate conversion algorithm is used for converting the image data obtained from the external environment sensors into a bird's-eye view. In the case of a front view display, the obtained image data may be directly displayed on the screen. The image processing unit 10 may display the traveling path 20 on the display unit 8 by superimposing the traveling path 20 on the bird's-eye view image, the front view or the like for clear understanding of the future trajectory of the vehicle 2 by the vehicle operator.

The invention claimed is:

1. A vehicle driving assist system, comprising:
an external environment acquiring unit configured to acquire information on external environment surrounding a vehicle;
a display unit having a screen displaying the information on the external environment;
a steering state acquiring unit configured to acquire a steering status of the vehicle; and
an image processing unit configured to determine a predicted trajectory of the vehicle according to the steering status of the vehicle, and superimpose the predicted trajectory on the information on the external environment displayed on the screen,
wherein in case the predicted trajectory happens to be a full circle, the image processing unit removes a far end part of the trajectory to be displayed so as not to be connected to a start point of the trajectory on the screen.

2. The vehicle driving assist system according to claim 1, wherein when the vehicle is turning, the predicted trajectory of the vehicle displayed on the screen includes an inner edge line indicating an inner edge of a region to be swept by the vehicle, and an outer edge line indicating an outer edge of the region to be swept by the vehicle.

3. The vehicle driving assist system according to claim 1, wherein in case the predicted trajectory happens to be a full circle, the image processing unit is configured to draw the trajectory to be displayed on the screen as a circular sector with a central angle equal to or greater than 180 degrees but smaller than 360 degrees.

4. The vehicle driving assist system according to claim 1, wherein when the predicted trajectory of the vehicle goes beyond an edge of the screen and comes back into the screen, the image processing unit removes a part of the trajectory to be displayed that comes back into the screen.

5. The vehicle driving assist system according to claim 2, wherein when the inner edge line of the predicted trajectory of the vehicle is a full circle, and the outer edge line is a circular sector with a central angle smaller than 360 degrees, the inner edge line and the outer edge line are displayed as circular sectors having mutually different central angles on the screen.

6. The vehicle driving assist system according to claim 5, wherein the central angle of the inner edge line that is displayed is greater than the central angle of the outer edge line.

7. The vehicle driving assist system according to claim 1, wherein the external environment acquiring unit comprises an image capturing device configured to capture an image of the external environment surrounding the vehicle, and the image processing unit is configured to convert the image acquired by the image capturing device into a bird's eye view to be displayed on the screen.

8. The vehicle driving assist system according to claim 2, wherein the image processing unit is configured to represent the predicted trajectory of the vehicle as a band area delimited by the inner edge line, the outer edge line and a front edge line extending from a remote end of the inner edge line orthogonally thereto.

9. The vehicle driving assist system according to claim 8, wherein the band area is represented by a semi-transparent band area superimposed on the display on the screen.

* * * * *